March 22, 1960   E. A. FUNK   2,929,522
CARRIER UNLOADING MECHANISM FOR CONVEYORS
Filed Oct. 23, 1957   3 Sheets-Sheet 1
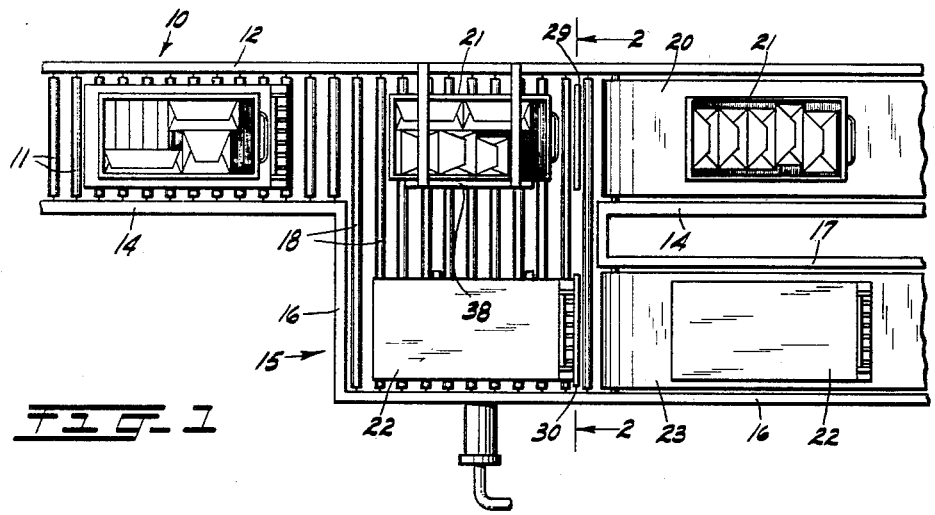
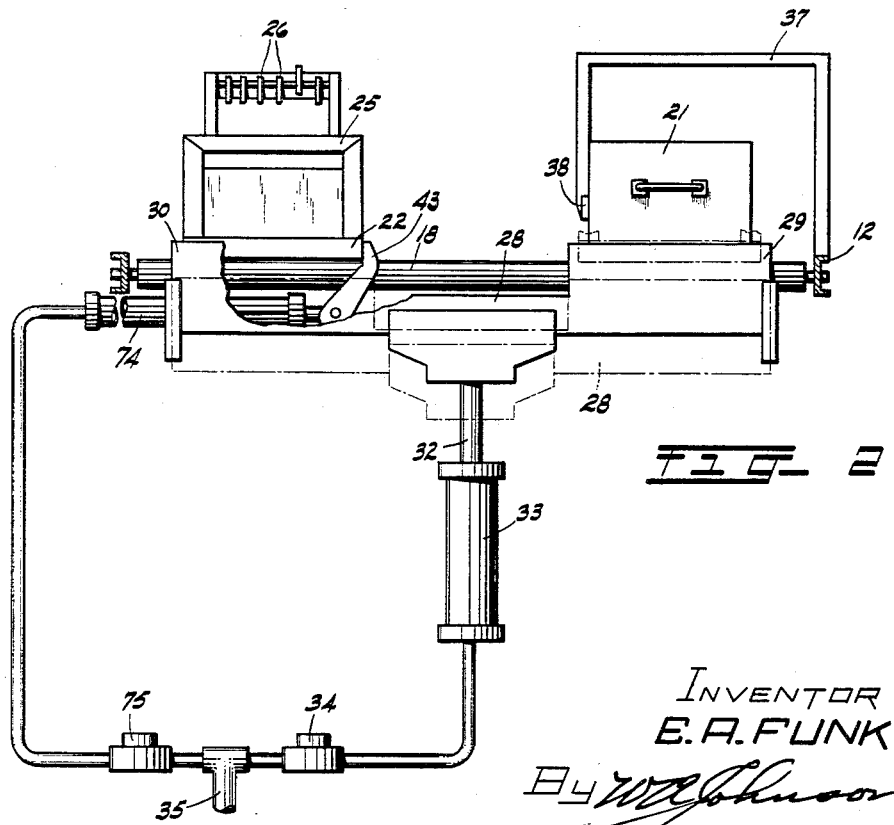
INVENTOR
E. A. FUNK

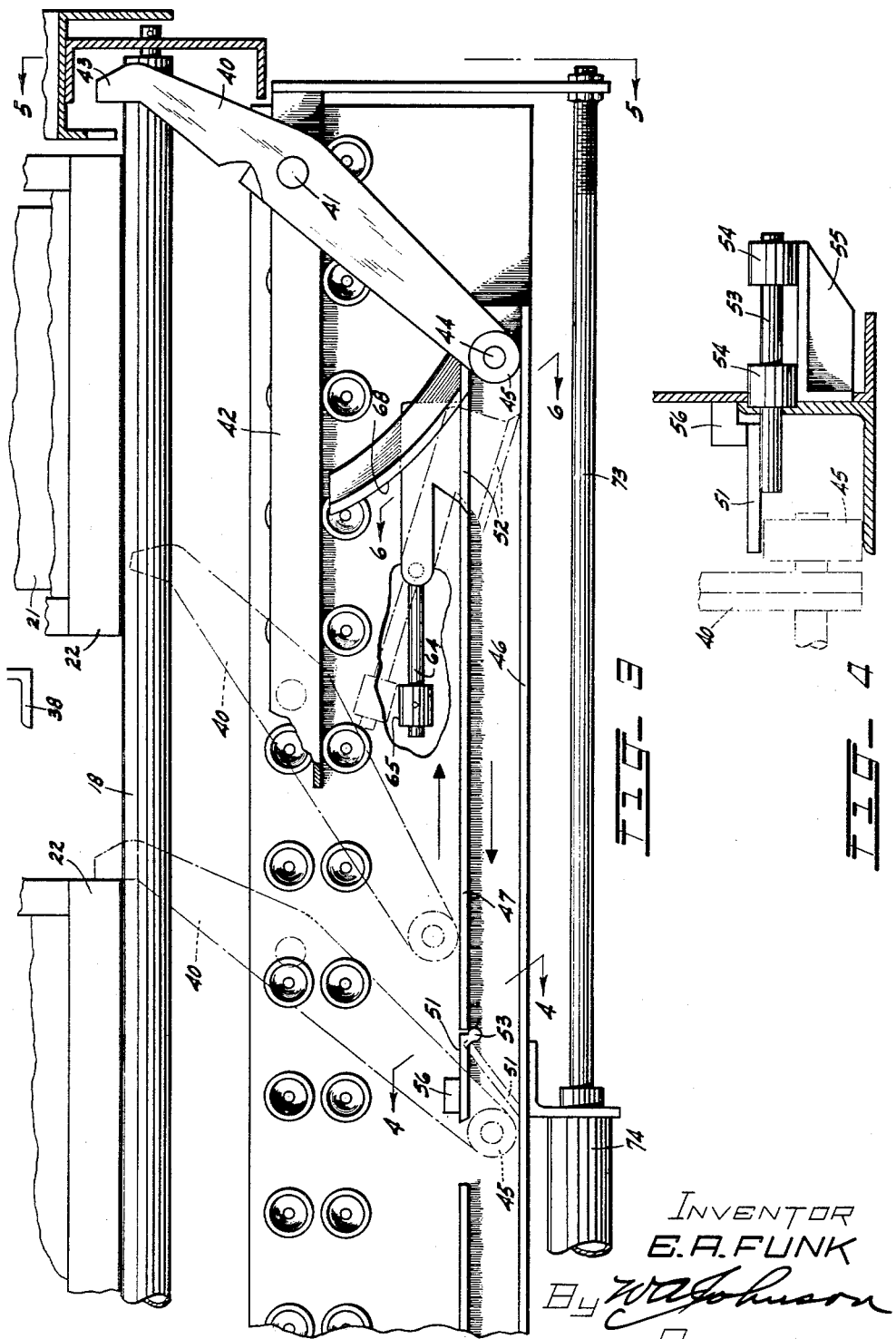

March 22, 1960 E. A. FUNK 2,929,522
CARRIER UNLOADING MECHANISM FOR CONVEYORS
Filed Oct. 23, 1957 3 Sheets-Sheet 3
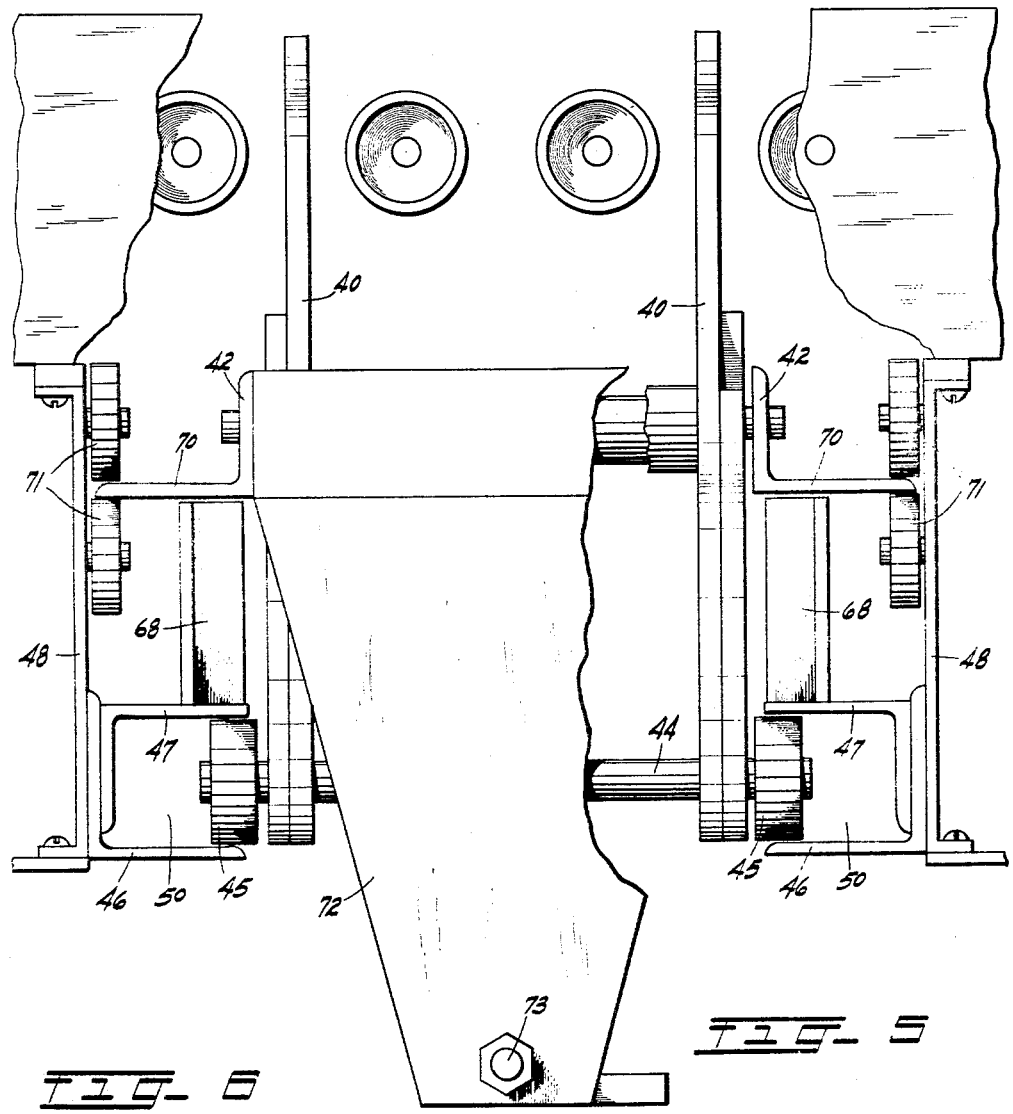
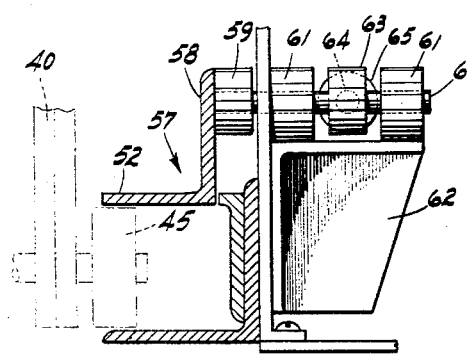
INVENTOR
E. A. FUNK
ATTORNEY

United States Patent Office 2,929,522
Patented Mar. 22, 1960

2,929,522

CARRIER UNLOADING MECHANISM FOR CONVEYORS

Edward A. Funk, Westfield, N.J., assignor to Western Electric Company, Incorporated, New York, N.Y., a corporation of New York Application October 23, 1957, Serial No. 691,881

8 Claims. (Cl. 214—310)

This invention relates to carrier unloading apparatus particularly apparatus for unloading carriers on conveyor systems.

In certain types of conveyor systems, in warehouses or the like where orders are to be filled, carriers may be directed along a main conveyor line and onto any desired number of spur lines to receive loads of articles required to fill the orders. In certain instances, the carriers may support hamper-like containers for receiving smaller articles, whereas larger articles may be placed directly upon the carriers and directed in their predetermined paths through the conveyor system. Adjacent the exit end of the conveyor system or at any other suitable point thereon, it is necessary to unload the carriers to permit the load, whether it be one or more large articles supported directly upon the carriers or smaller articles disposed in hampers disposed on the carriers, to continue to a shipping station and to free the carriers for further service on the conveyor system.

An object of the present invention is an apparatus which is simple in structure and highly efficient in separating a carrier from a load thereon in a conveyor system.

In accordance with the object, the invention includes a carrier unloading apparatus for a conveyor adapted to cause carriers with loads thereon to travel in a given path, the apparatus including a receiving member mounted at one side of the conveyor with means disposed adjacent the juncture of the conveyor and the receiving member to hold the load against lateral displacement while the carrier is removed therefrom and moved onto the receiving member.

More specifically the apparatus embodies an area where extra long rollers serve for a portion of the main line of the conveyor system and a receiving area. A transfer arm is movable in a controlled path, between a pair of the rollers to engage a carrier and move it laterally of the main line and longitudinally of the long rollers to free it of its load and transfer it to the receiving member. The transfer arm is pivotally supported by a carriage reciprocable in a path parallel with the long rollers while a follower of the transfer arm is forced to travel in one guided path in one direction, to position its upper end above the rollers, and in another guided path in the opposite direction to render it ineffective by positioning its upper end beneath the upper surfaces of the rollers.

Other objects and advantages will be apparent from the following detailed description, when considered in conjunction with the accompanying drawings, wherein:

Fig. 1 is a fragmentary top plan view of a conveyor system embodying the invention;

Fig. 2 is an enlarged fragmentary sectional view taken along the line 2—2 of Fig. 1;

Fig. 3 is a fragmentary vertical sectional view of a portion of the apparatus;

Fig. 4 is a fragmentary sectional view taken along the line 4—4 of Fig. 3;

Fig. 5 is an enlarged fragmentary sectional view taken along the line 5—5 of Fig. 3, and Fig. 6 is a fragmentary sectional view taken along the line 6—6 of Fig. 3.

In Fig. 1 a small portion of a conveyor system is shown including an exit end 10 of a main line wherein rollers 11 of conventional length are rotatably supported between frames 12 and 14. The frame 14 is open at a receiving area 15 where auxiliary frames 16 and 17 cooperating with the open ends of the frame 14 to receive and assist in supporting long rollers 18. The long rollers 18 occupy a portion of the main line 10 and the receiving member 15. In the present illustration the main conveyor extends downwardly in the form of a ramp where a driven endless belt 20 will receive the loads 21 removed from carriers 22 and convey them to a shipping zone (not shown) or any other desired area. A similar ramp-like conveyor including a driven endless belt 23 extends from the receiving area 15 of the unloading zone to convey the empty carriers 22 away from the unloading zone.

In the present instance, the carriers are substantially L-shaped with their lower horizontal portions riding on the rollers or belts of the conveyors and their vertical portions 5 supporting routing elements 26 in positions where they may be effective to actuate controls for the conveyor system. Also, in the present illustration, the loads 21 have been illustrated as hampers in which articles may be disposed. It should be understood that larger packages may be placed directly upon the carriers 22 and unloaded therefrom onto the long rollers 18 which are driven by suitable means (not shown) in a conventional manner to advance the hampers or loads onto the belt 20 and to advance the empty containers onto the belt 23.

A suitable stop 28 is positioned parallel with the longitudinal rollers 18 and provided with portions 29 and 30 normally located beneath the plane of the upper surfaces of the rollers 18 as shown in broken lines in Fig. 2, to be moved vertically to locate the portions 29 and 30 in the path of carriers and loads as illustrated in Fig. 1. In the present illustration the stop 28 is operatively connected to a piston rod 32 of an air cylinder 33 which is under control of a valve 34 to receive air under pressure from a supply line 35. If desired, the stop 28 may be pivotally supported and rocked into and out of stopping position through operation of the air cylinder and control valve. A substantially U-shaped bridge 37, fixed to the frame 12 at one end and extending across the path of carriers with articles thereon approaching the unloading area, supports a holder 38 to hold the hamper or load 21 of each carrier brought into this position during movement of the carrier from beneath the load to the position shown in Fig. 2.

The means to transfer the carrier 22 in each instance, from the main line 10 to the receiving member at the unloading station, includes transfer arms 40 identical in structure and pivotally mounted at 41 upon each side of a carriage 42. The upper ends 43 of the transfer arms 40 are positioned above the plane of the top surfaces of the long rollers 18 when moved to the left Figs. 2 and 4 and are disposed beneath the plane when returned or moved to the right. A spindle 44 connects the transfer arms 40 at the lower ends thereof and rollers 45 are mounted on the outer ends of the spindle. There are two tracks for each roller 45 including a lower track 46 and an upper track 47 formed of angle members, secured together in their respective paths as shown in Fig. 5, and also secured to vertical frames 48. Actually the tracks 46 and 47 form the guide ways 50 to definitely control the paths of movement of the rollers 45 to the left to assure maintaining the upper ends of the transfer arms in their operating positions. The upper track 47 is provided with trap doors 51 and 52. The trap door 51 is pivotally supported at 53, which in the present instance is a shaft, Fig. 4, journaled in bearings 54 supported by a bracket 55. The trap door 51 may be a plate welded to the shaft 53. A stop 56 limits clockwise motion of the door 51 while the weight of the door will cause it to drop from the solid line position, shown in Fig. 3, to the broken line position shown therein. The trap door 52 in each track 47 includes an angle member indicated generally 57 Fig. 6, the horizontal portion of which is formed with tapered edges, as shown in Fig. 3, to fit in an opening with similarly tapered edges cut in the horizontal portion of the track 47. The vertical portion 58 of each angle member 57 is fixed to a collar 59, the collar being fixedly mounted on a spindle 60 which is journaled in bearings 61 mounted upon a bracket 62. A collar 63 is fixed to a central portion of the spindle 60 and carries a rod 64 for supporting a weight 65. The weight is adjusted on the rod 64 to assure movement of the door 52 from the broken line open position shown in Fig. 3 to its solid line closed position when released by the rollers 45. Arcuate cams 68 are rigidly mounted on the path of each roller 45 when returning to the starting position to guide the rollers downwardly, causing them to open the trap doors 52 and move beyond the areas of the doors distances sufficient to free the doors for closing.

The carriage 42 includes angle members 70 supported for movement in a given plane between pairs of rollers 71. A member 72 fixed at its upper end to the carriage 42 extends downwardly to a position where its lower end is connected to a piston rod 73 of an air cylinder 74. The air cylinder 74 as shown in Fig. 2, is connected to the supply line 35 through a valve 75.

Considering now the operation of the apparatus let it be assumed that each carrier 22 reaching the unloading station is to be separated from its load and allowed to travel in a separate path from the unloading area. The valves 34 and 75 may be foot operated or hand operated and by operation of the valve 34 the stop 28 will be moved across the path of an oncoming carrier to stop the carrier in alignment with the receiving area of the unloading station. As soon as the carrier is stopped, the load which may include an individual package or a hamper 21 loaded with packages, will lie within the area of the stop or holder 38. At this time valve 75 may be actuated to operate the air cylinder 74 to move the carriage 42 from the position shown in Fig. 3, to the left, at which time the transfer arms 40—43 will engage the carrier 22 to move it laterally from the mainline 10 to the receiving area of the unloading zone. This area is composed of the long rollers 18 on which the carrier is allowed to slide longitudinally with the upper ends of the transfer arms projecting between pairs of the long rollers. The transfer arms will move to the left with the rollers 45 traveling in the guideways 50, causing their trap doors 51 to move upwardly to the solid line position shown in Fig. 3. After the rollers 45 move beyond the trap doors 51 the trap doors will drop by gravity to the broken line positions. After releasing the valve 75, causing the air cylinder to return the carriage to its starting position the rollers 45 of the transfer arms will ride up the doors 51, causing rocking movements of the transfer arms about their pivots 41 to lower the upper ends 43 of the arms beneath the plane of the upper surfaces of the rollers so that they will not interfere with the hamper or load in returning to the starting positions. The rollers 45 will ride upon the tracks 47 until they reach the cams 68, at which time they will be caused to move downwardly against their trap doors 52, to open these doors so that the rollers will enter the areas 50 between the tracks 46 and 47, after which the doors 52 will be closed by their weights 65, conditioning the tracks for the next transfer of a carrier from the main line to the receiving areas of the unloading zone.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Carrier unloading apparatus for a conveyor slanting downwardly to cause carriers with loads thereon to travel in a given path, the apparatus comprising a receiving member mounted at one side of the conveyor, a stop positioned normally out of the path, means actuable to move the stop to cause it to traverse a portion of the path to stop a carrier in alignment with the receiving member, an abutment mounted adjacent the juncture of the conveyor and the receiving member to hold the load against lateral movement from the conveyor, and an ejector actuated to engage and move the carrier from beneath the load, off the conveyor and onto the receiving member.

2. Carrier unloading apparatus for a conveyor slanting downwardly to cause carriers with loads thereon to travel in a given path, the apparatus comprising a receiving member mounted at one side of the conveyor, a stop positioned normally out of the path, means actuable to move the stop to cause it is to traverse a portion of the path to stop a carrier in alignment with the receiving member, an abutment mounted adjacent the juncture of the conveyor and the receiving member to hold the load against lateral movement from the conveyor, an ejector actuated to engage and move the carrier from beneath its load and the conveyor to the receiving member, and an auxiliary conveyor for the empty carriers leading away from the receiving member.

3. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuable to move the stop into the path to stop a carrier on the main conveyor in alignment with the receiving area, means disposed adjacent the juncture of the main conveyor and the receiving area to hold the load against lateral movement from the conveyor, and means to move the carrier on the long rollers from beneath the load and from the main conveyor to the receiving area.

4. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuable to move the stop into the path to stop a carrier on the main conveyor in alignment with the receiving area, means disposed adjacent the juncture of the main conveyor and the receiving area to hold the load against lateral movement from the conveyor, means to move the carrier on the long rollers from beneath the load and from the main conveyor to the receiving area, and an auxiliary conveyor for the empty carrier leading away from the receiving area.

5. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuatable to move the stop in the path to stop a carrier on the main conveyor in alignment with the receiving area, means disposed adjacent the juncture of the main conveyor and the receiving area to hold the load against lateral movement from the conveyor, means to move the carrier on the long rollers from beneath the load and from the main conveyor to the receiving area, and an auxiliary conveyor for the empty carrier leading away from the receiving area, the stop, when in the path, extending into the receiving area to hold the empty carrier free of the auxiliary conveyor until the completion of the movement of the carrier into the receiving area.

6. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuable to move the stop into the path to stop a carrier on the main conveyor in alignment with the receiving area, means disposed adjacent the juncture of the main conveyor and the receiving area to hold the load against lateral movement from the conveyor, a carriage supported for reciprocable movement beneath and transversely of the main conveyor and the receiving area, a transfer arm movably supported by the carriage between an upper position to engage a stopped carrier on the main conveyor and a lower position beneath the path, and means actuable to reciprocate the carriage to move the carrier adjacent the stop from beneath its load and from the main conveyor on the long rollers to the receiving area.

7. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuable to move the stop into the path to stop a carrier on the main conveyor in alignment with the receiving area, means disposed adjacent the juncture of the main conveyor and the receiving area to hold the load against lateral movement from the conveyor, a carriage supported for reciprocable movement beneath and transversely of the main conveyor and the receiving area, a transfer arm movably supported by the carriage between an upper position to engage a stopped carrier on the main conveyor and a lower position beneath the path, means actuable to reciprocate the carriage to move the carrier adjacent the stop from beneath its load and from the main conveyor on the long rollers to the receiving area, and means actuable to cause movement of the transfer arm from its lower to its upper position for engagement with the carrier.

8. In a conveyor structure, a main conveyor including rollers supported between spaced frames for rotation, the frames slanting downwardly to cause carriers with loads thereon to travel successively in a given path over the rollers, one of the frames having an open portion therein, a receiving area disposed adjacent the open frame portion, an auxiliary frame partially surrounding the receiving area, long rollers extending from the auxiliary frame through the receiving area and the open portion to the unopened frame of the main conveyor, a stop normally disposed out of the path, means actuable to move the stop into the path to stop a carrier on the main conveyor in alignment with the receiving area, means disposed adjacent the juncture of the main conveyor and the receiving area to hold the load against lateral movement from the conveyor, a carriage supported for reciprocable movement beneath and transversely of the main conveyor and the receiving area, a transfer arm movably supported by the carriage between an upper position to engage a stopped carrier on the main conveyor and a lower position beneath the path, means actuable to reciprocate the carriage to move the carrier adjacent the stop from beneath its load and from the main conveyor on the long rollers to the receiving area, and means actuable to cause movement of the transfer arm from its upper to its lower position after a carrier has been moved from the main conveyor to the receiving area.

References Cited in the file of this patent

UNITED STATES PATENTS

| | | |
|---|---|---|
| 1,295,195 | Parker | Feb. 25, 1919 |
| 2,574,394 | Isler | Nov. 6, 1951 |
| 2,606,483 | Forbes | Aug. 12, 1952 |
| 2,636,625 | Pries | Apr. 28, 1953 |